(12) United States Patent
Kruger et al.

(10) Patent No.: US 10,400,785 B2
(45) Date of Patent: Sep. 3, 2019

(54) HIGH PITCH STALL RESISTING PROPELLER

(71) Applicants: CLEANFUTURE ENERGY CO LTD., Bangsue, Bangkok (TH); Uli Kruger, Aldgate (AU)

(72) Inventors: Uli Kruger, Aldgate (AU); Sutepong Pochana, Bangkok (TH)

(73) Assignees: Cleanfuture Energy Co Ltd., Bangkok (TH); Uli Kruger, Aldgate, South Australia (AU)

( * ) Notice: Subject to any disclaimer, the term of this patent is extended or adjusted under 35 U.S.C. 154(b) by 349 days.

(21) Appl. No.: 15/302,660

(22) PCT Filed: Apr. 7, 2015

(86) PCT No.: PCT/AU2015/000209
§ 371 (c)(1),
(2) Date: Oct. 7, 2016

(87) PCT Pub. No.: WO2015/154131
PCT Pub. Date: Oct. 15, 2015

(65) Prior Publication Data
US 2017/0030370 A1 Feb. 2, 2017

(30) Foreign Application Priority Data

Apr. 8, 2014 (AU) ................................. 2014901273

(51) Int. Cl.
*F04D 19/00* (2006.01)
*F04D 29/38* (2006.01)
(Continued)

(52) U.S. Cl.
CPC ............. *F04D 29/384* (2013.01); *B63H 1/26* (2013.01); *B64C 11/18* (2013.01); *F04D 19/005* (2013.01); *F04D 25/088* (2013.01)

(58) Field of Classification Search
CPC .... F04D 25/088; F04D 29/384; F04D 29/005; B63H 1/26; B64C 11/18
See application file for complete search history.

(56) References Cited

U.S. PATENT DOCUMENTS 5,108,257 A * 4/1992 Fukazawa ............. B63H 11/08
415/182.1
6,280,143 B1 * 8/2001 Parker ................... F04D 29/284
416/186 R
(Continued)

FOREIGN PATENT DOCUMENTS

WO 1997003291 1/1997

*Primary Examiner* — Woody A Lee, Jr.
(74) *Attorney, Agent, or Firm* — Sand Sebolt & Wernow Co., LPA

(57) ABSTRACT

A propeller formed along the lines of a vortex, i.e. a Fibonacci spiral projected onto a surface formed by a square hyperbola. Fluid flows evenly along the length of the propeller with less turbulence allowing it to operate at a higher pitch without stalling and resulting in reduced power requirements for a given flow rate. The underlying geometric shape of a vortex is an equiangular logarithmic spiral also known as golden spiral or Fibonacci spiral as is often found in natural objects ranging from sea shells to spiral galaxies. When viewed three dimensionally, the fluid flow in a vortex can be drawn as a projection of a golden spiral onto a surface of revolution of a square hyperbola where the vertex is equal to one and the focus is equal to the square root of 2.

6 Claims, 11 Drawing Sheets

(51) Int. Cl.
*B63H 1/26* (2006.01)
*F04D 25/08* (2006.01)
*B64C 11/18* (2006.01)

(56) References Cited

U.S. PATENT DOCUMENTS

| | | |
|---|---|---|
| 6,702,552 B1 | 3/2004 | Harman |
| 2008/0145230 A1 | 6/2008 | Harman et al. |
| 2010/0303609 A1* | 12/2010 | Kabe .................. F04D 3/02 |
| | | 415/71 |
| 2011/0311363 A1* | 12/2011 | Bills .................. F03D 1/0633 |
| | | 416/176 |
| 2014/0086754 A1* | 3/2014 | Seiji .................. F04D 29/384 |
| | | 416/237 |

* cited by examiner

HIGH PITCH STALL RESISTING PROPELLER

FIELD OF THE INVENTION

The present invention relates to a propeller, in particular a high pitch stall resisting propeller.

BACKGROUND TO THE INVENTION

A propeller is a device to convert torque into thrust, thereby converting rotational motion into linear motion by accelerating fluid axially. For a propeller to generate the maximum amount of thrust with the least amount of shaft power input, a combination of high blade pitch and low rotational speed is of advantage.

The maximum pitch that can be applied to the propeller is in practice limited by the velocity of the fluid it is operated in. If the incoming fluid velocity is low or zero, the propeller blade will experience stall at too high pitch angles and will not move any fluid at all. A fan or static thruster which operates in zero velocity conditions is therefore limited in how efficient it can operate due to pitch angle constrains.

The object of this invention is to provide a propeller that can be operated at high blade pitch angles at zero fluid velocity inflow conditions without stalling, delivering equivalent thrust at significantly reduced power input levels when compared to conventional type propellers, or at least provides the public with a useful alternative to conventional propellers.

SUMMARY OF THE INVENTION

In a first aspect the invention comprises a propeller blade with a surface geometry defined by the projection of surface lines from an origin to a three dimensional spiral, wherein the spiral is formed by the projection of a two dimensional spiral onto a surface of revolution defined by a hyperbola.

Preferably the two dimensional spiral is a Fibonacci spiral.

In preference the hyperbola is a square hyperbola and the vertex of the hyperbola is equal to 1 and the focus of the hyperbola is equal to the square root of 2.

Preferably the leading and trailing portions of the blade are symmetrical, or for increased performance in one direction the leading portion is smaller than the trailing portion.

Preferably the thickness of the blade is uniform.

In a further aspect the invention comprises a propeller with a plurality of propeller blades as described above.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE INVENTION

Figure 1:
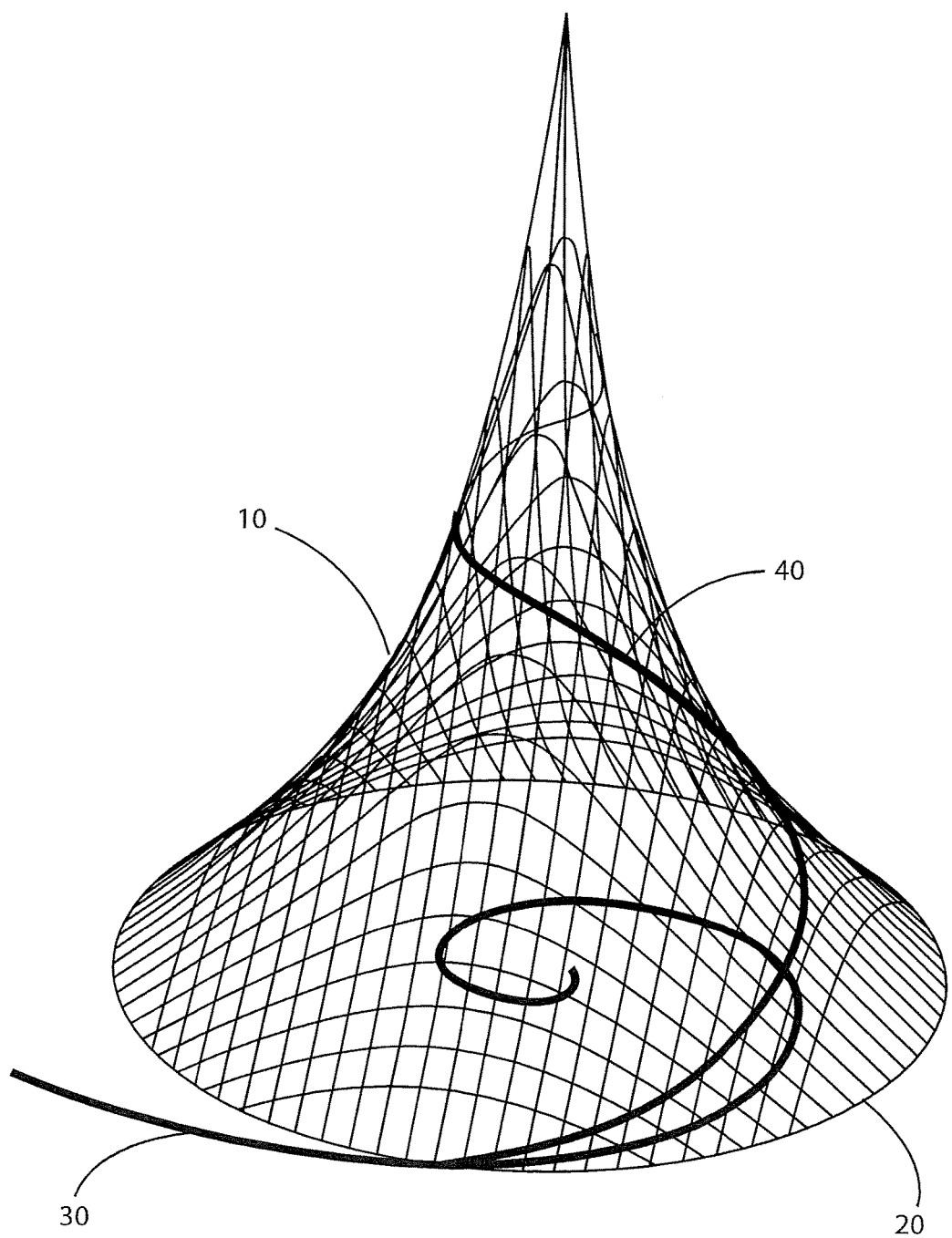
FIG. 1 shows a spiral projected onto a surface of revolution of a hyperbola used to determine the geometry of a propeller blade of the present invention. A mesh is included to aid 3d visualisation.

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The invention describes propellers comprising logarithmically scaled blades where their surface contours are derived from the flow contours inherent in a natural vortex. It has been found that propellers constructed in this manner can be operated at high blade pitch angles at zero fluid velocity inflow conditions without stalling, delivering equivalent thrust at significantly reduced power input levels when compared to conventional type propellers.

Fluid flow inside of a vortex funnel occurs in a self-organised manner in accordance with clearly defined geometric parameters. In a vortex, the fluid will flow without turbulence and with greater velocity. The propeller blades described in the invention, have surface contours derived from the vortex flow-line geometry resulting in propellers that resist the formation of surface turbulence and will engender an even and coherent fluid flow across their surfaces. As a result, the propellers may be operated at steep pitch angles in low fluid inflow velocity conditions, without stalling. By operating at a lower rotational speed at the same air volume delivery rate, significantly less shaft power is consumed and as the blade tip speed is reduced, noise is also reduced. Alternatively a fixed amount of power can be used to deliver a higher volume of air when compared with conventional propellers.

The underlying geometric shape of a vortex is an equiangular logarithmic spiral also known as golden spiral or Fibonacci spiral as is often found in natural objects ranging from sea shells to spiral galaxies. When viewed three dimensionally, the fluid flow in a vortex can be drawn as a projection of a golden spiral onto a surface of revolution of a square hyperbola where the vertex is equal to 1 and the focus is equal to the square root of 2.

Figure 2:
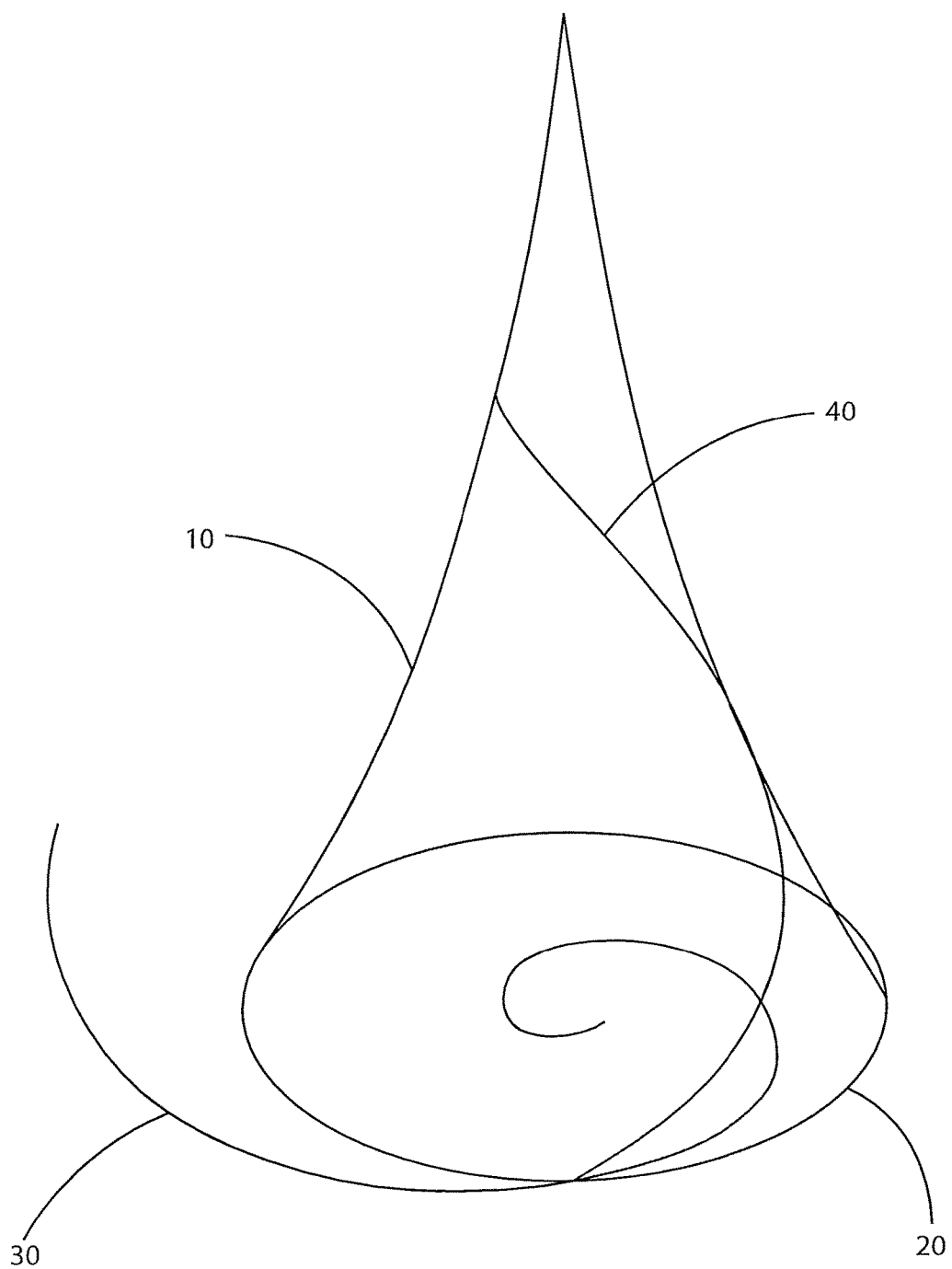
FIG. 2 shows FIG. 1 without a mesh.

FIG. 1 shows the basic geometrical components used to define the surface of a propeller blade according to the invention. A square hyperbola is shown as 10, and 20 shows the base formed as the hyperbola is rotated through 360° to form a surface of revolution. A golden spiral 30 around the origin of the hyperbola is projected onto the surface of revolution to form a 3d spiral 40 corresponding to the fluid flow in a vortex. FIG. 1 is shown with a grid to aid visualisation. A further representation of the geometry is shown without a grid in FIG. 2.

Figure 3:
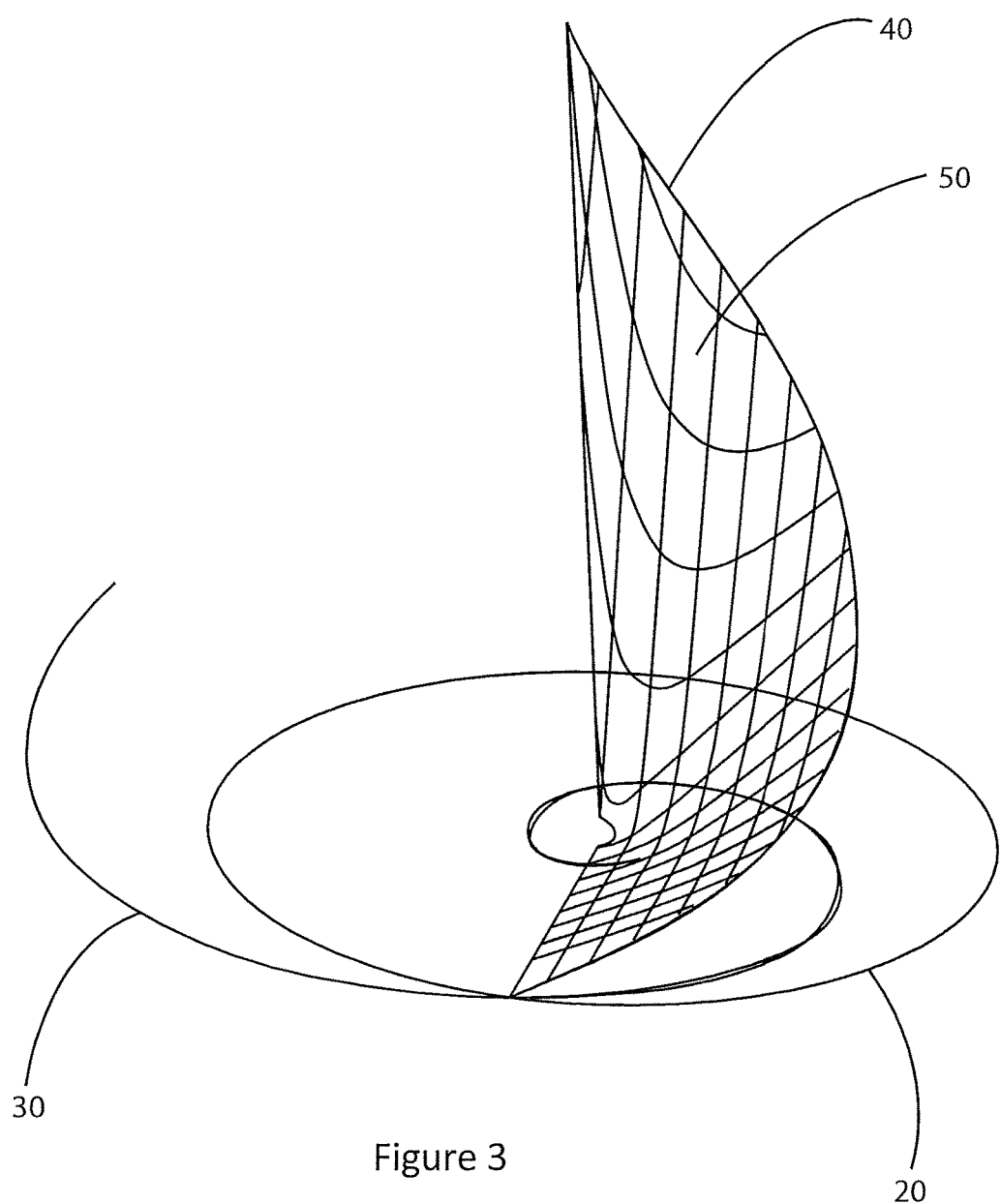
FIG. 3 shows a three dimensional surface constructed from the projection of FIG. 2 representing half the surface geometry of a propeller blade.

A first half surface geometry 50 of a propeller blade is shown by the mesh in FIG. 3 which is formed from lines starting at the origin (of the spiral and the hyperbola) and terminating on the 3d spiral 40.

Figure 4:
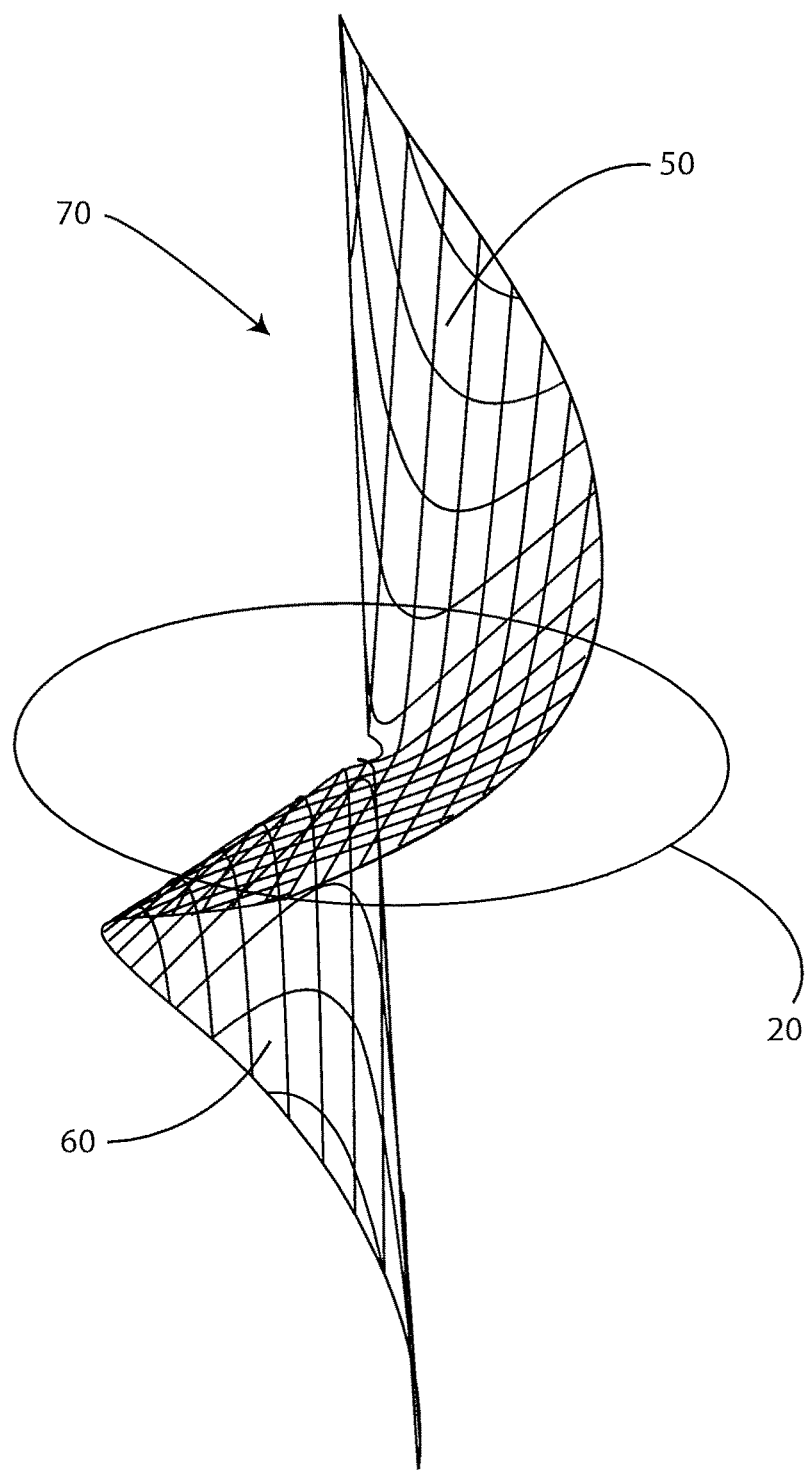
FIG. 4 shows the surface of FIG. 3 copied and rotated to produce a complete surface geometry of a propeller blade.

In FIG. 4 the surface 50 is copied and rotated to make a second surface 60. Together the surfaces create a continuous surface 70 with diverging and converging flow contours.

Figure 5:
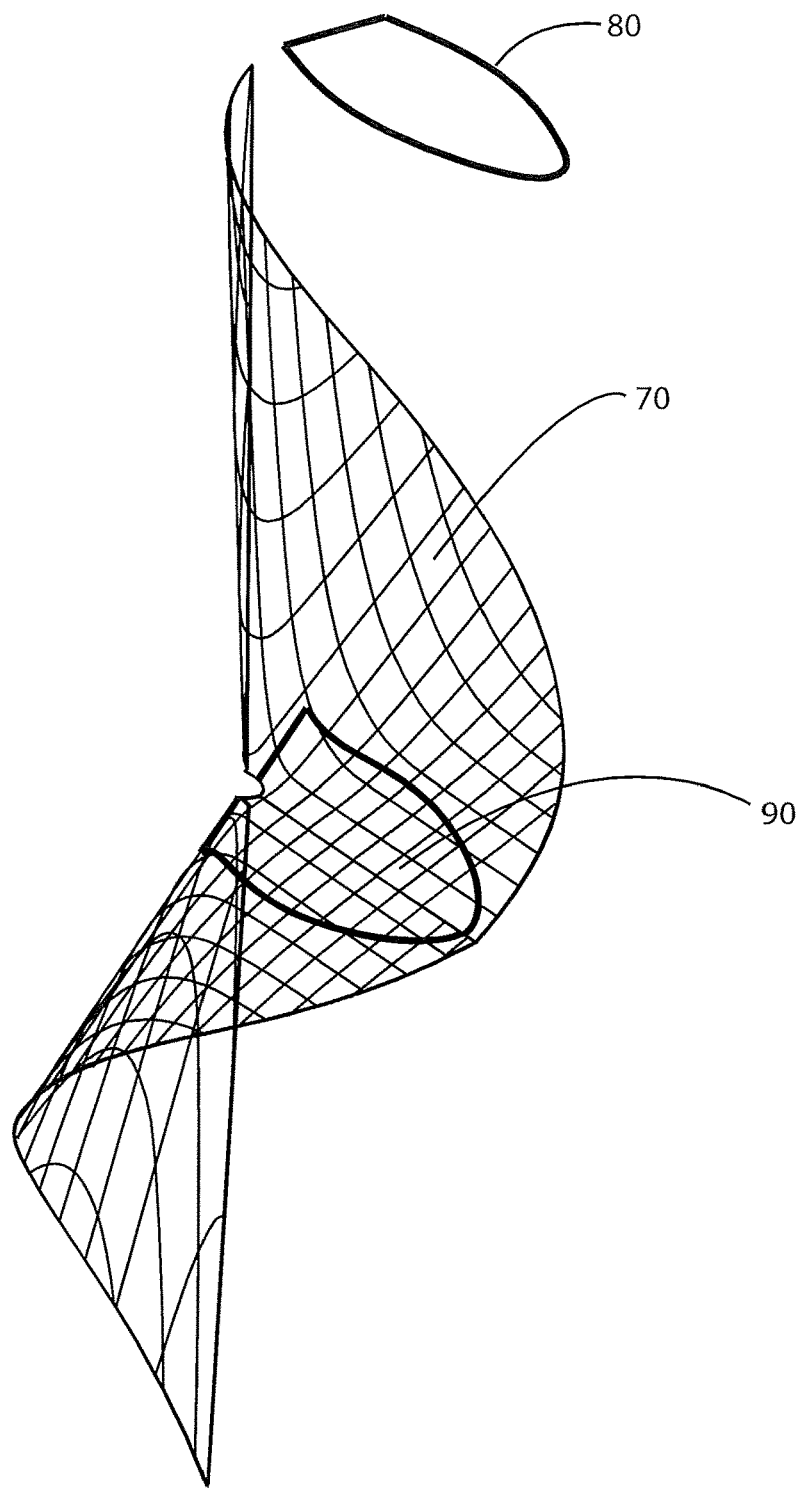
FIG. 5 shows a first propeller blade profile being projected onto the surface of FIG. 4 to form a first propeller blade.

A first blade profile is shown as 80 in FIG. 5. The blade profile is projected onto the surface 70 to form a first propeller blade 90.

Figure 6:
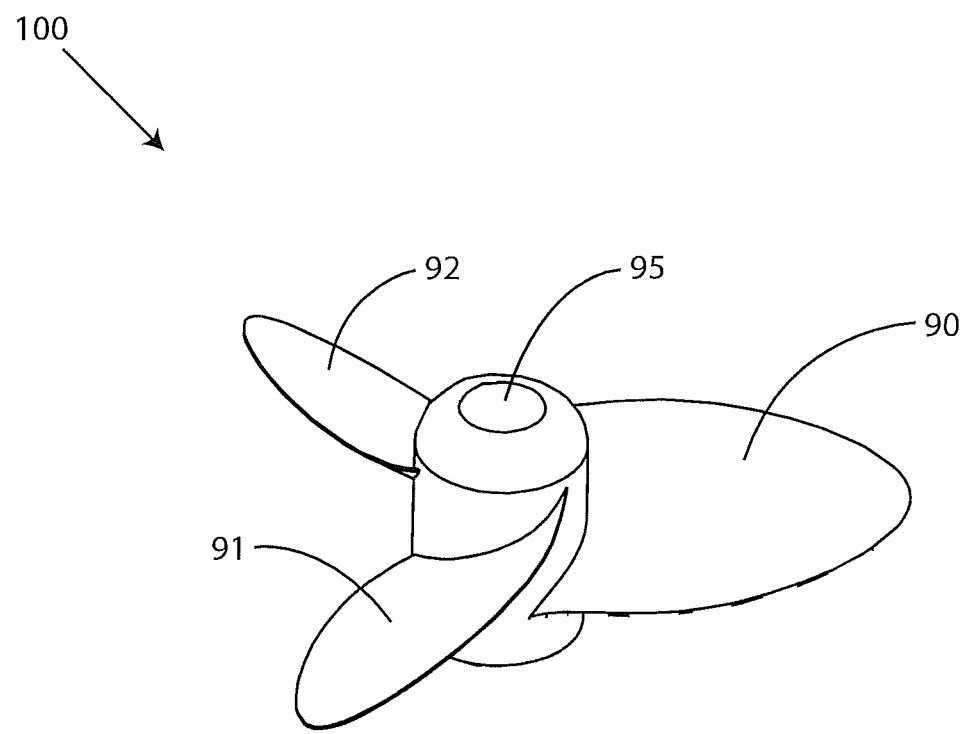
FIG. 6 shows a first propeller formed by three blades of FIG. 5 displaced about a central hub.

A first complete propeller 100 is shown in FIG. 6 and comprises a blade 90 and two identical copies 91 and 92 evenly spaced around a hub 95.

The symmetric profile across the XY horizontal cross section of the first propeller blades provides equal performance in both directions of rotation of the propeller.

The blade profile may be varied for either aesthetic or performance considerations and also the blade may or may not extend to the hub of the propeller. Such variations have shown to have minimal impact on performance.

Figure 7:
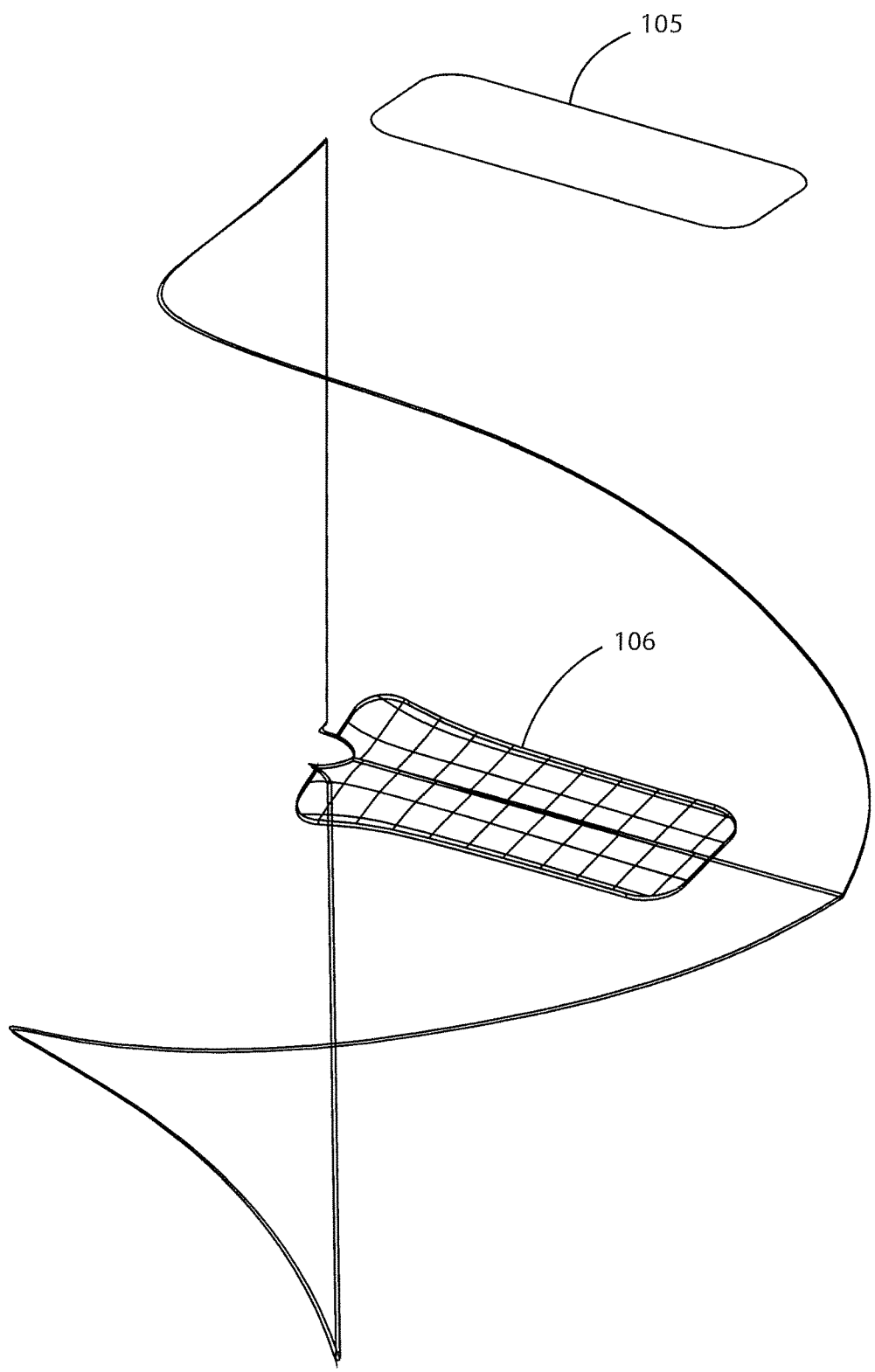
FIG. 7 shows a second propeller blade profile being projected onto the surface of FIG. 4 to form a second propeller blade.
Figure 8:
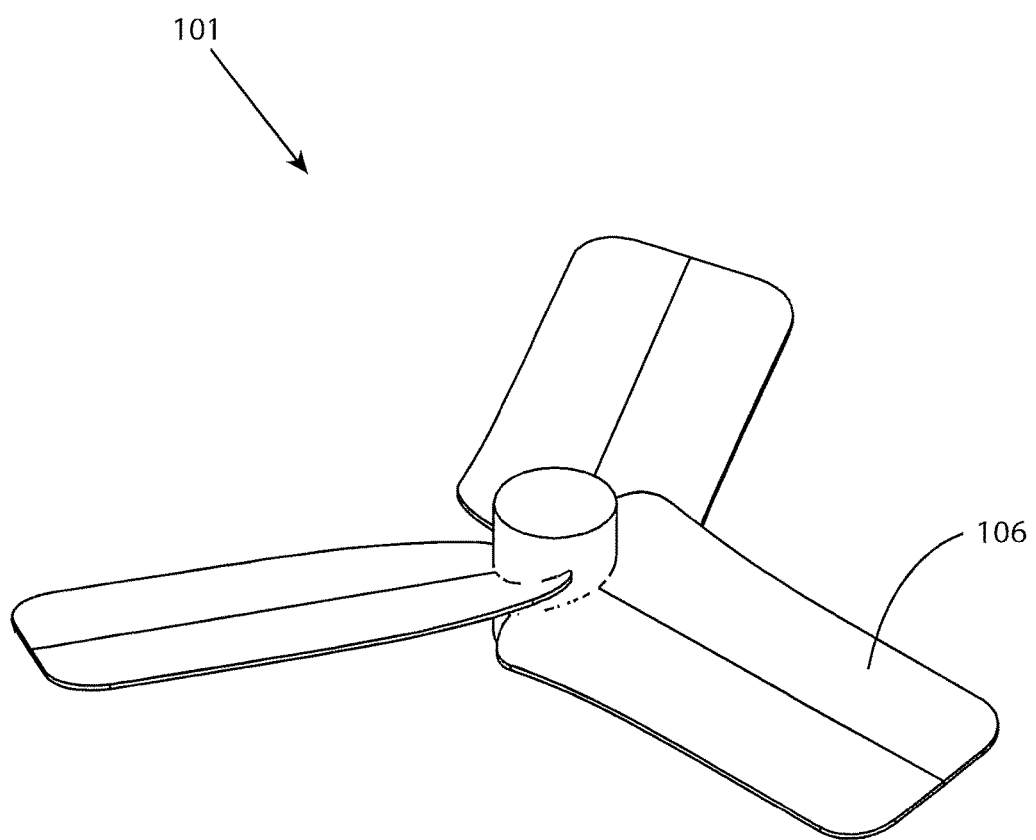
FIG. 8 shows a second propeller formed by three blades of FIG. 7 displaced about a central hub.

A second symmetric blade profile is shown as 105 in FIG. 7. The blade profile is projected onto the surface to form a second propeller blade 106; which in combination with two further blades forms a second propeller 101 as shown in FIG. 8.

Figure 9:
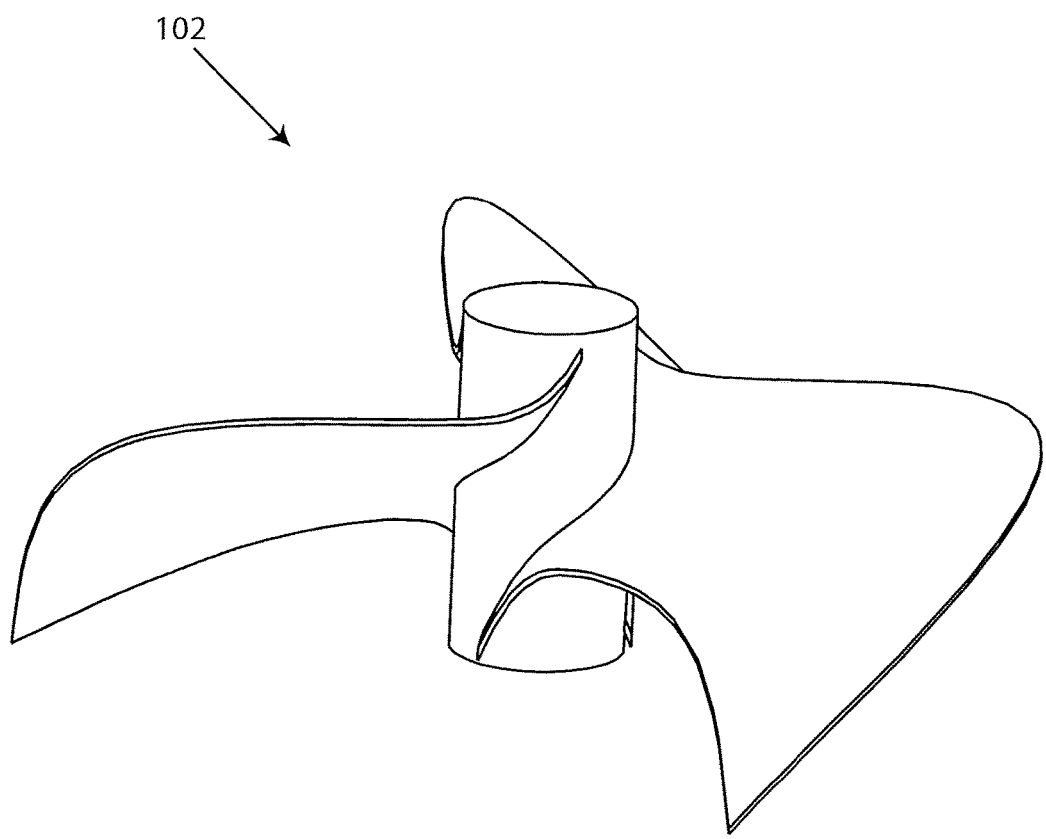
FIG. 9 shows a third propeller formed with an asymmetric profile.

In an alternative embodiment of the invention an asymmetric projection onto the surface of FIG. 4 is used to produce an asymmetric blade profile. A propeller incorporating such a blade profile is shown as 102 in FIG. 9. Such a propeller will operate in a first direction (with the narrower part of the profile leading) with greater efficiency than the symmetric propellers of FIGS. 6 and 8 as the lower blade height reduces drag. The propeller will also operate in the reverse direction, albeit with lower efficiency.

The propeller 100 of FIG. 6 has been shown in wind tunnel testing to have an even and consistent airspeed across the entire length of the blade which leads to its efficiency. In contrast a fan of conventional profile has the highest airspeed at roughly ⅔ of its diameter reducing to zero towards the centre and the tip.

A working prototype of the invention was produced and compared with a conventional ceiling fan with a diameter of 1.1 m. At a shaft speed of 150 rpm the standard fan delivered 107 $m^3$/minute of air using 9.8 W of power. In comparison, the fan of the invention operating at a shaft speed of 100 rpm delivered 114 $m^3$/minute of air using just 5.7 W of power. This represents a 46% increase in efficiency. Further tests and simulations of different blade diameters and speeds have shown comparable improvements. It has also been demonstrated that the pitch is optimal at all speeds. This is unlike conventional propellers which have an optimal pitch that is speed dependent. This abrogates the need for a pitch control mechanism with the obvious simplicity and cost advantages. Airflow is adjusted by varying the speed of the propeller alone, which is relatively simple to implement. By being able to produce the same airflow at a lower speed the propellers are much quitter in operation, with tests showing a reduction in noise from 92 dB to 83 dB measured 30 cm from the blades.

Figure 10:
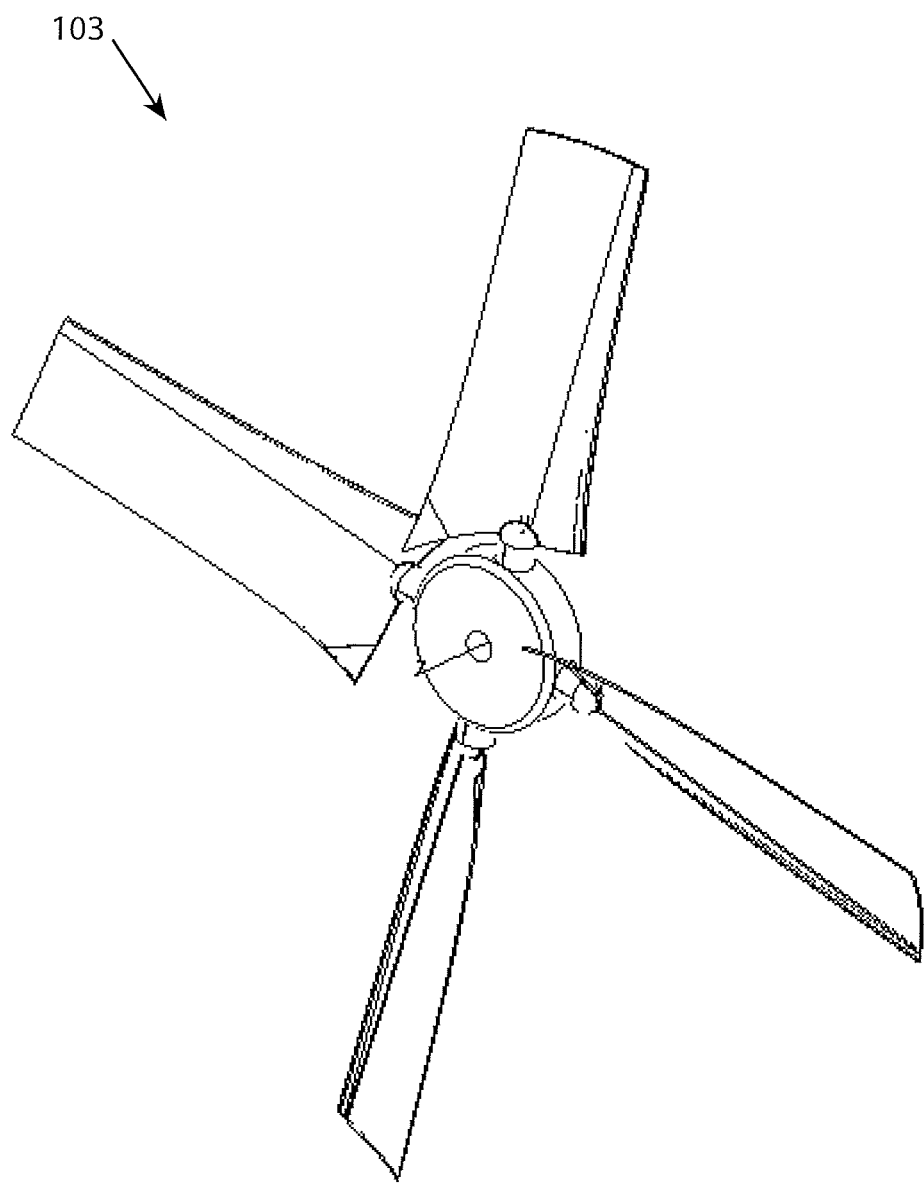
FIG. 10 shows a fourth propeller formed that is compared with the prior art propeller of FIG. 11.
Figure 11:
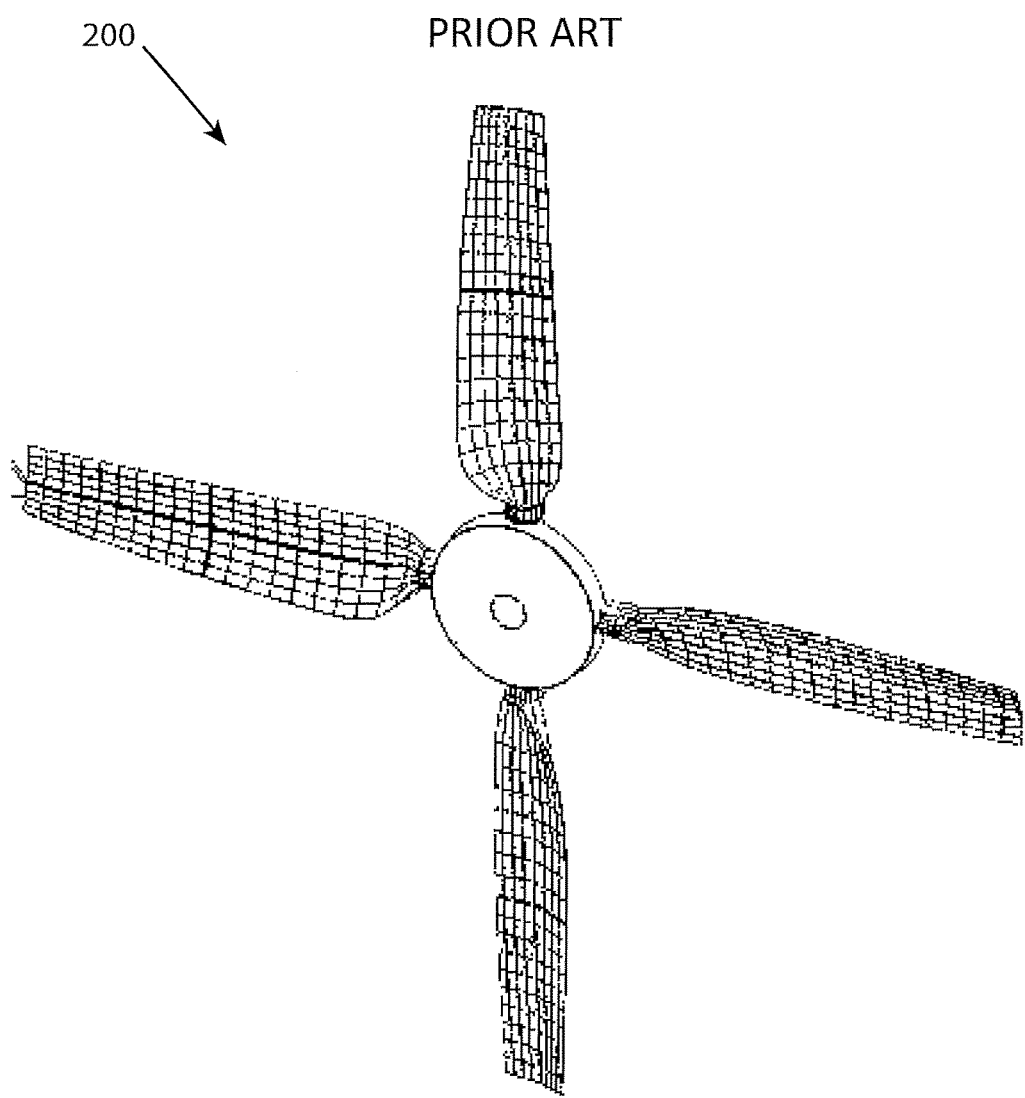
FIG. 11 shows a prior art propeller used for comparison purposes.

A further asymmetric propeller made in accordance with the invention is shown as 103 in FIG. 10. The profile of this propeller does not extend all the way to the hub. This propeller has been extensively modelled and compared to one of the better performing examples of prior art propellers on the market shown as 200 in FIG. 11.

A velocity trace of the air-flow through the propellers shows a straight coherent air flow through the propeller 103 of the invention, but a turbulent airflow through the prior art propeller 200. Pressure plots of the propellers shows minimal high pressure zones on the outer front trailing edge of the propeller 103, but significant high pressure zones all along the front trailing edge and all along the rear leading edge of the propeller 200. Accordingly, the shaft power needed to produce an airflow of 891 $m^3$/min. using a 1.5 m diameter fan is only 1.198 kW for the fan 103 compared with 1.832 kW for the prior art fan 200.

The propeller is also unlike many traditional propellers in that it does not need to act as an aerofoil and can thus be made a uniform thickness. This is advantageous as it greatly simplifies construction of the propellers as they can be stamped from a metal sheet. The propellers can also be extremely thin thus reducing drag.

In a further embodiment of the invention, not shown, the leading and trailing portions of the propeller are made asymmetric. A propeller with a steeper leading profile has been found to offer even greater performance advantages.

The reader will now appreciate the present invention which provides a propeller that can be operated at high blade pitch angles at zero fluid velocity inflow conditions without stalling, delivering equivalent thrust at significantly reduced power input levels when compared to conventional type propellers.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:
1. A propeller blade comprising:
   a blade profile having a leading edge and a trailing edge; wherein the blade profile is projected onto part of a surface configured by projecting surface lines from an origin to a three dimensional spiral, wherein the spiral is formed by the projection of a two dimensional spiral onto a surface of revolution defined by a hyperbola.
2. The propeller blade as in claim 1 wherein the two dimensional spiral is a Fibonacci spiral.
3. The propeller blade as in claim 1 wherein the hyperbola is a square hyperbola.

4. The propeller blade as in claim 1 wherein a vertex of the hyperbola is equal to 1 and a focus of the hyperbola is equal to the square root of 2.

5. The propeller blade as in claim 1, wherein the leading edge and trailing edge are symmetrical.

6. The propeller blade as in claim 1, wherein the leading edge and trailing edge are asymmetrical.

* * * * *